United States Patent [19]

Takeda

[11] Patent Number: 4,565,166
[45] Date of Patent: Jan. 21, 1986

[54] INTAKE SYSTEM FOR AN INTERNAL COMBUSTION ENGINE

[75] Inventor: Keiso Takeda, Susono, Japan

[73] Assignee: Toyota Jidosha Kabushiki Kaisha, Toyota, Japan

[21] Appl. No.: 629,336

[22] Filed: Jul. 10, 1984

[30] Foreign Application Priority Data

Oct. 11, 1983 [JP] Japan .................. 58-188532

[51] Int. Cl.⁴ ............................... F02B 27/02
[52] U.S. Cl. ................... 123/52 M; 123/52 MB; 123/389
[58] Field of Search ......... 123/52 M, 52 MB, 52 MC, 123/308, 432, 389

[56] References Cited

U.S. PATENT DOCUMENTS

| | | | |
|---|---|---|---|
| 3,814,069 | 6/1974 | Croft et al. | 123/52 M |
| 4,168,680 | 9/1979 | Kawai et al. | 123/389 |
| 4,304,211 | 12/1981 | Tezuka et al. | 123/432 |
| 4,343,277 | 8/1982 | Ohnaka et al. | 123/389 |
| 4,402,297 | 9/1983 | Hyodd et al. | 123/52 M |

FOREIGN PATENT DOCUMENTS

| | | | |
|---|---|---|---|
| 0891339 | 9/1953 | Fed. Rep. of Germany | 123/52 MB |
| 55-87821 | 7/1980 | Japan. | |
| 0544657 | 4/1942 | United Kingdom | 123/52 M |

Primary Examiner—Craig R. Feinberg
Attorney, Agent, or Firm—Kenyon & Kenyon

[57] ABSTRACT

An intake system for an internal combustion engine, the system having an air tank of a predetermined volume. The tank is connected to a intake pipe of the engine via a first connecting pipe. The tank is connected to an air cleaner via a second connecting pipe. A control valve is arranged at a position where the first connecting pipe is connected to the intake pipe so as to change the effective intake pipe length. The control valve is operated in response to the operating conditions of the engine to select the effective intake pipe length capable of attaining increased volumetric efficiency.

12 Claims, 10 Drawing Figures

INTAKE SYSTEM FOR AN INTERNAL COMBUSTION ENGINE

BACKGROUND OF THE INVENTION

1. Field of the Invention

The present invention relates to an intake system for an internal combustion engine, more particularly to an intake system provided with a chamber of a predetermined volume located adjacent to an engine intake pipe and connected at one side to an intake passageway upstream of an intake manifold and downstream of an air cleaner so as to make effective use of the dynamic action of the intake air.

2. Background of the Invention

It is well known that, in an internal combustion engine, one can increase volumetric efficiency and achieve improved engine output and torque by making use of the so-called dynamic intake effect. The dynamic intake effect is achieved at the engine rotational speed, or whole multiples thereof, corresponding to the natural frequency of the intake pipe. Therefore, one can design an engine so as to achieve the dynamic intake effect at a certain rotational speed by selecting a suitable length of the intake pipe.

Obviously, it is desirable to obtain this dynamic intake effect at engine rotational speeds other than that corresponding to the fundamental natural frequency of the intake pipe or a multiple thereof. Toward this end, it has been proposed to provide an intake system equipped with a chamber of a predetermined volume adjacent to the engine intake pipe. The chamber is connected to the intake pipe by way of a control valve which is opened or closed in accordance with the engine operating conditions, in particular, the engine rotational speed. (See Japanese Unexamined Patent Publication (Kokai) No. 55-87821.)

With this chamber, it is possible to change the effective intake pipe length, and thus the natural frequency of the intake pipe, by just opening or closing the control valve. Thus, it is possible to cause different engine rotational speeds to produce V peaks in rotational speed-volumetric efficiency ($\eta V$) curves. During engine operation, the control valve is opened or closed in accordance with the engine rotational speed so as to select the volumetric efficiency (nV) curve resulting in the higher volumetric efficiency. This enables increased torque to be obtained at every range of engine rotational speed.

This prior art arrangement suffers, however, from the drawback of increased noise during induction of intake air. This is principally due to the fact that the point where the air cleaner is connected to the intake pipe must act as an "open end" in the dynamic intake effect when the control valve is closed. For this reason, the air cleaner should have a nose of a shortened length. This shortened nose causes increased noise when intake air flows into the air cleaner.

SUMMARY OF THE INVENTION

An object of the present invention is to provide an intake apparatus of a type wherein the effective intake pipe length, i.e., the natural frequency of the intake pipe, is changed in accordance with the engine operating conditions while reducing noise.

According to the present invention, there is provided an intake system for an internal combustion engine, comprising: an air cleaner; a main intake passageway for connecting the air cleaner with the engine; a throttle valve arranged in the main intake passageway; and a second intake passageway having a chamber of a predetermined volume. The second intake passageway is, on one end, connected to the air cleaner so that the second intake passageway is opened inside of the air cleaner. The second intake passageway is, on the other end, connected to the main intake passageway at a position upstream of the throttle valve. The system further comprises sensor means for detecting engine operating conditions and control means, responsive to the sensed engine operating conditions, for controlling fluidal communication of the second intake passageway with the main intake passageway. This enables attainment of a desired effective intake pipe length, i.e., natural frequency of the intake pipe, in each of the operating conditions.

BRIEF DESCRIPTION OF THE DRAWINGS

Other objects and advantages of the present invention will become apparent from the ensuing description and accompanying drawings, in which.

DESCRIPTION OF THE PREFERRED EMBODIMENTS

Figure 1:
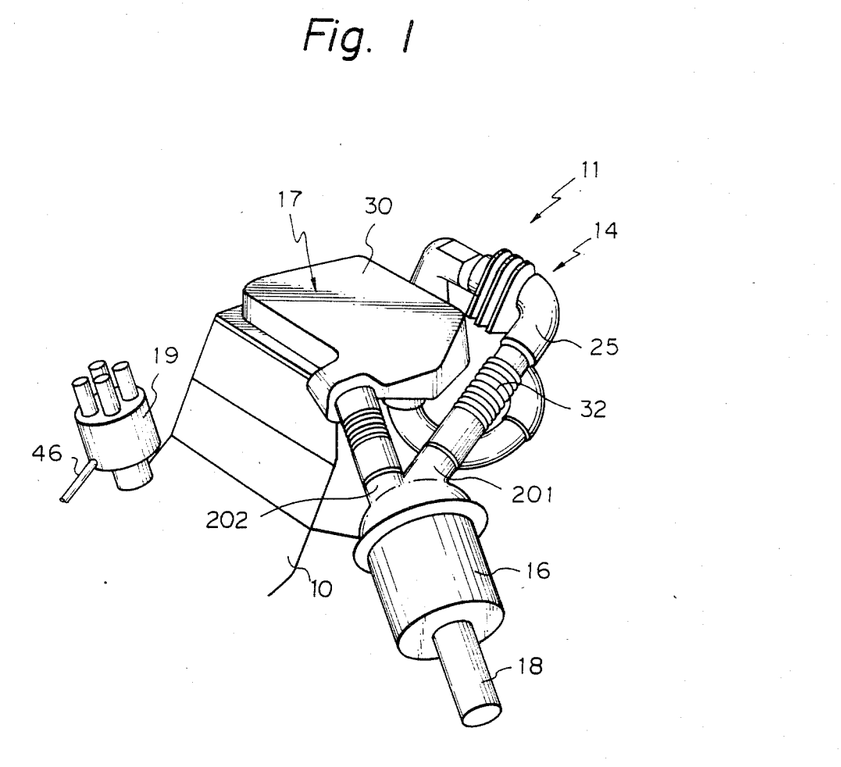
FIG. 1 is a schematic view of an internal combustion engine provided with an intake system according to the present invention.
Figure 2:
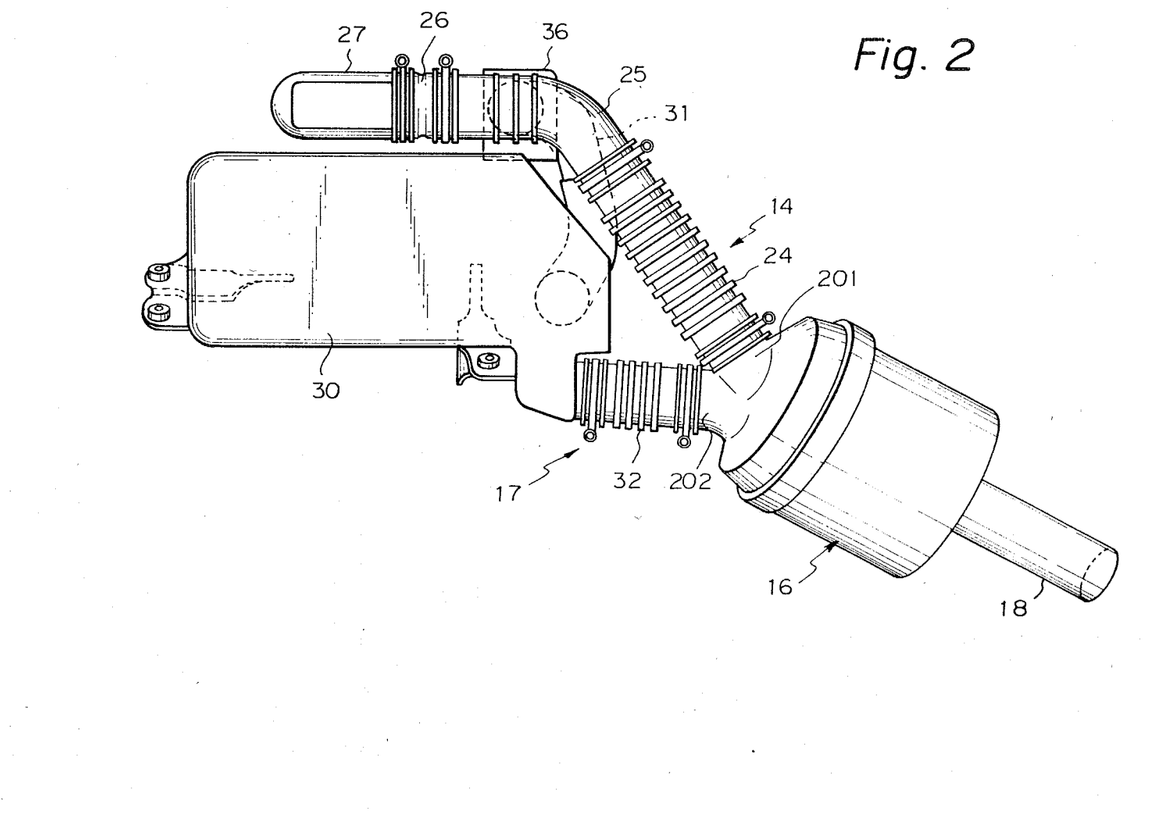
FIG. 2 is a plan view of the engine of FIG. 1 seen from above.
Figure 3:
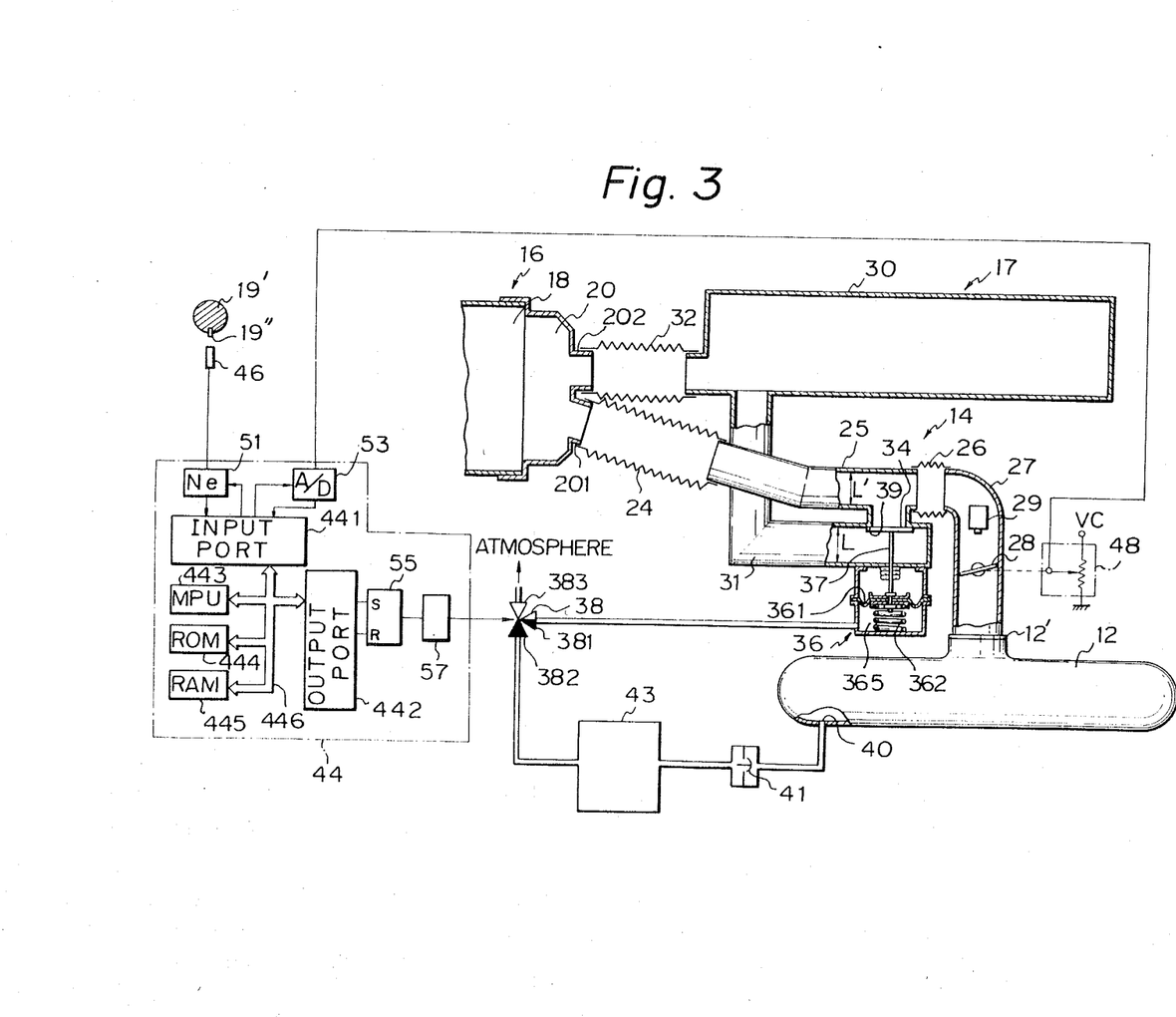
FIG. 3 is a diagram of the intake system of a first embodiment of the present invention.

Referring to FIGS. 1, 2, and 3, reference numeral 10 denotes an engine body on which an intake system of the present invention, shown generally by reference numeral 11, is mounted. The intake system 11 has one end connected to an air cleaner 16 and the other end connected to an intake manifold 12 of the engine. The intake system 11 includes a main intake line 14 and a sub-intake line 17 provided with a tank 30. Reference numeral 19 shows a distributor.

The air cleaner 16 has therein a filter element 18 which defines on one side thereof a space 20 which communicates, as shown in FIG. 3, with both the main intake line 14 and the subintake line 17. The air cleaner 16 has on the other side of the filter element 18 another chamber (not shown) communicating with the atmosphere by way of a nose inlet pipe 28, as shown in FIG. 4.

The main intake line 14 includes a flexible hose 24 having one end connected to a union 201, which is integral with the case of the air cleaner 16, so as to open to the space 20, a pipe 25 connected to the other end of the flexible hose 24, a flexible hose 26 having one end connected to the pipe 25, and a throttle body 27 having an end connected to the flexible hose 26. The other end of the throttle body 27 is connected to a flange portion 12' of the intake manifold 12. The throttle body 27 is provided therein with a throttle valve 28 and a single fuel injector 29 located upstream of the throttle valve 28.

The sub-intake line 17 includes the tank 30, located adjacent to the main intake line 14, a first connecting pipe 31 connecting the tank 30 with the pipe 25 of the main intake line 14 and a second connecting pipe 32 made as a flexible hose which is on one end connected to the tank 30 and is on the other end connected with a union pipe 202 which is integral to the case of the air cleaner 16 so as to open to the space 20. A control valve 34 is provided at a position where the first connecting pipe 31 is connected to the pipe 25 of the main intake line 14. The first connecting pipe 31 connecting the main intake line 14 with the tank 30 has an inner diameter L which is equal to or larger than the inner diameter L' of the main intake line 14. This condition is indispensable for achieving the dynamic intake effect by the opening and closing operation of the control valve 34.

Figure 4:
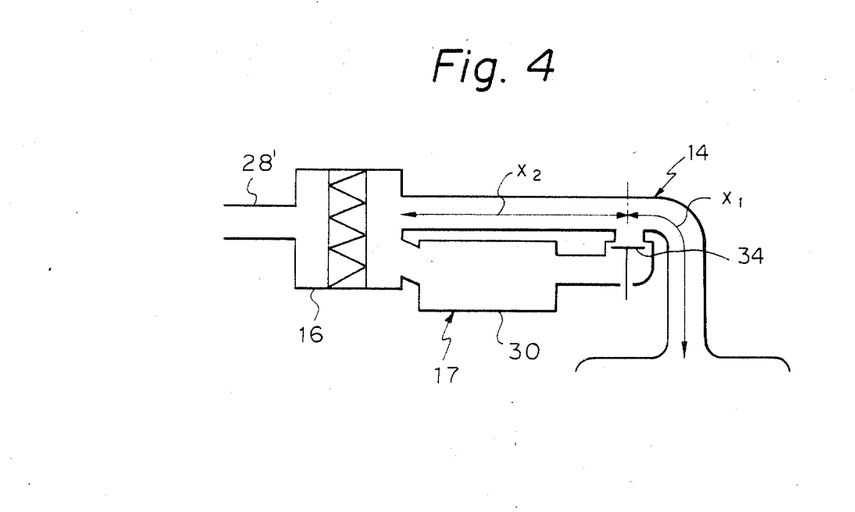
FIG. 4 is a view illustrating the principle of the present invention.
Figure 5:
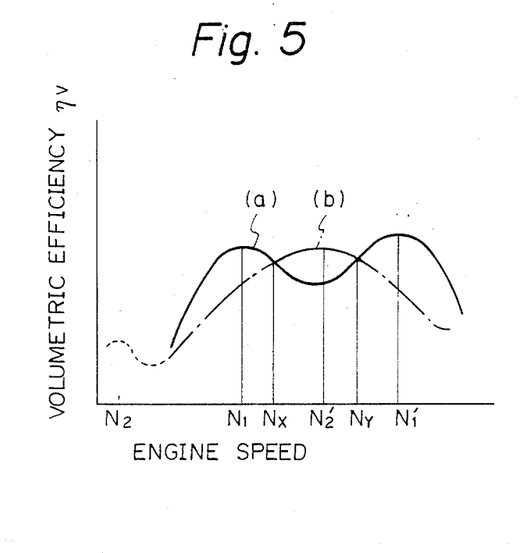
FIG. 5 shows the relationship between rotational speed and volumetric efficiency.

In FIG. 4, showing schematically the construction of the present invention, the place where the main intake line 14 is connected to the sub intake line 17 corresponds to the "open end" in the dynamic intake effect when the control valve 34 is open. This means that the portion of the intake system located upstream of that place can be neglected, so that the effective intake pipe length is shortened to $x_1$. In this case, the intake system has a natural frequency of a large value. Under this condition, the volumetric efficiency curve (a), as shown in FIG. 5 with respect to the change of the engine rotational speed, has a first order resonance at the rotational speed of $N_1$ and a second order resonance at $N_1'$. In other words, the volumetric efficiency $\eta V$ peaks at those rotational speeds.

When the control valve 34 is closed, the "open end" is moved to the location where the main intake line 14 is connected to the air cleaner 16, resulting in an increase in the effective intake pipe length to $x_1 + x_2$ and a decrease in the natural frequency of the intake pipe. As a result, the volumetric efficiency curve (b) in FIG. 5, with respect to the engine rotational speed, has a second order resonance at the rotational speed $N_2'$, which is smaller than the rotational speed $N_1'$ producing the second order resonance with the control valve 34 is opened. The curve (b) theoretically has a first order resonance at a rotational speed $N_2$, which is smaller than the rotational speed $N_1$ where the first order resonance is produced when the control valve 34 is opened. Such a first order resonance does not actually appear.

Figure 6:
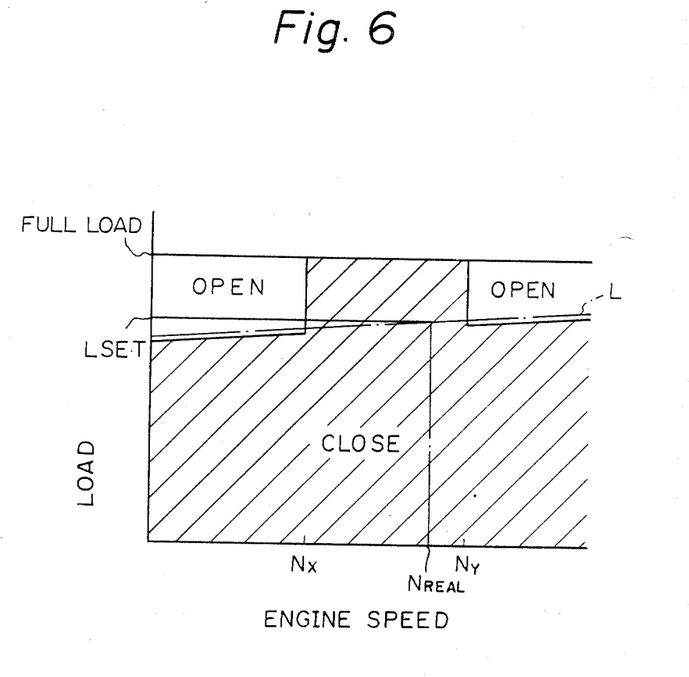
FIG. 6 is a diagram of conditions of the control valve with respect to combinations of engine speed and load.

It should be noted that the change of the volumetric efficiency between the curves (a) and (b) takes place when the engine load is high. FIG. 6 schematically illustrates this. When the load of the engine is in a range below a dotted line L, the volumetric efficiency is maintained without being changed irrespective of the position of the control valve 34. However, when the load of the engine is in a range above the dotted line L, the change of the curve of volumetric efficiency as described with reference to FIG. 5 is attained. The value of the load on the dotted line L changes in accordance with the rotational speed of the engine, as shown in FIG. 6. In view of the above, in the area below the line L, it is not important whether the control valve 34 is opened or shut in order to attain a high volumetric efficiency. In the illustrated embodiment, the control valve 34 is maintained to a closed condition when the engine load is in the range below the line L, as will be fully described later.

As described above, the characteristic of volumetric efficiency with respect to the rotational speed changes between the curves (a) and (b) by opening or closing the control volumetric valve 34. An enhanced volumetric efficiency can thus be obtained at each rotational speed of the engine by opening or closing the control valve 34 at rotational speed values $N_x$ and $N_y$, points where the two curves (a) and (b) intersect, so as to select the curve producing the higher volumetric efficiency.

Toward this end, a control device is connected to the control valve 34 in FIG. 3. Reference numeral 36 is an actuator of a vacuum-operated type. The actuator 36 has a diaphragm 361 connected to the control valve 34 by way of a rod 37 and a vacuum chamber 365 formed on one side of the diaphragm 361. When the valve member 34 is seated on a valve seat 39, the first connecting pipe 31 connected to the tank 30 is disconnected from the main intake line 14.

Reference numeral 38 designates a three-way switching valve for selectively connecting the diaphragm 361 to the vacuum source or an atmospheric air pressure source. A vacuum port 40 is formed as a vacuum source in the intake manifold 12. In a vacuum line connecting the vacuum port 40 with the three-way switching valve 38, arranged in series are a vacuum accumulation chamber 43, for maintaining a sufficient level of vacuum for operating the vacuum actuator when the control valve 34 is in a wide open condition, and a check valve 41, which check valve opens when the pressure in the vacuum accumulation chamber 43 is higher than that of the intake manifold 12.

The three-way switching valve 38 is formed as a solenoid type and has a first, second, and third ports 381, 382, and 383. The three-way switching valve 38 is energized in a first condition where the first port 381 is connected to the second port 382 and is deenergized in a second condition where the first port 381 is connected to the third port 383. A control circuit 44 for operating the three-way switching valve 38 receives electric signals from various sensors, including an engine rotational speed sensor 46 and an engine load sensor 48.

The engine rotational speed sensor 46 is in this embodiment a proximity switch mounted on a distributor so that it faces a magnetic piece 19'' on a distributor shaft 19' (FIG. 3). A digital signal is produced for indicating the rotational speed of the distributor shaft 19' (FIG. 3). Of course, another type of engine rotational speed sensor may also be utilized.

The engine load sensor 48 in this embodiment is a potentiometer-type connected to the shaft of the throttle valve 28 for producing an analog signal corresponding to the opening of the throttle valve 28. Other types of engine load sensors may of course also be employed.

The control circuit 44 is in this embodiment constituted by a microcomputer system. The control circuit 44 has an input port 441 which receives signals via an engine-speed forming circuit 51 and an analog-to-digital converter 53. The engine-speed forming circuit 51 is a kind of counter for counting the number of pulses in the signal from the engine rotational speed sensor 46. The analog-to-digital converter 53 changes the analog signal from the engine load sensor 48 into a digital signal. The control circuit 44 also includes an output port 442 which issues a signal for operating the three-way switching valve 38 via a flip-flop unit 55 and a power amplifier 57. The input port 441 and the output port 442 are connected by way of a bus 446 to a microprocessing unit 443, read only memory 444, and random access memory 445, which are constituted elements of the microcomputer system.

Figure 7:
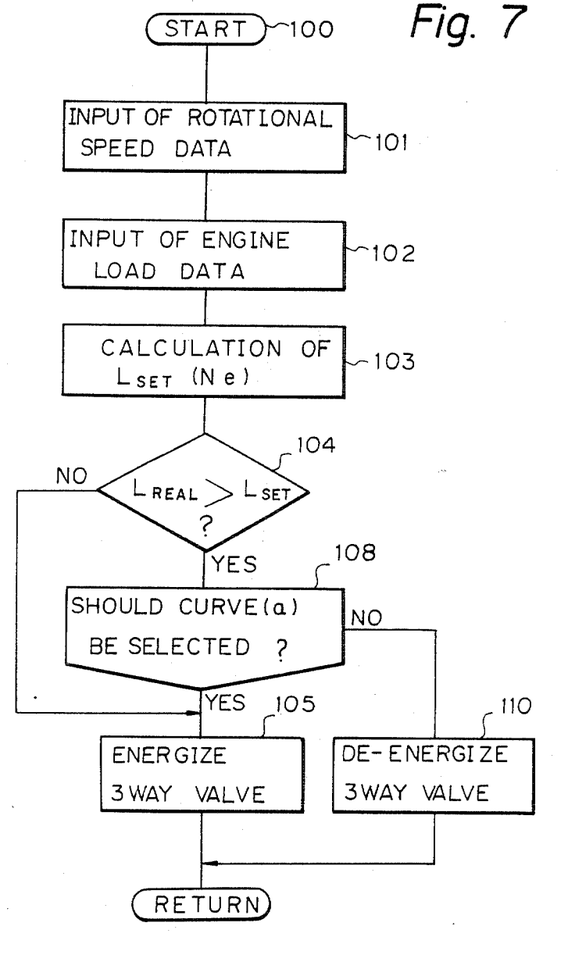
FIG. 7 is a flowchart of a routine effected in a computer.

The control circuit 44 has software for attaining a large volumetric efficiency at every rotational speed of the engine by selection of the suitable effective length of the intake pipe. This software is stored in the memory as a program. With reference to FIG. 7, at a point 100, the program enters into the calculation mode. At the next point 101, data of the load sensed by the engine load sensor 48 are introduced into the microprocessing unit 443. At a point 102, a data of rotational speed sensed by the engine rotational speed sensor 46 are introduced into the microprocessing unit 443. At a point 103, a preset value of load above which level the dynamic effect is obtained is calculated. This calculation is effected as follows. The read only memory 444 is provided with a map which is constructed by data of preset values of loads for various rotational speeds of the engine, which correspond to the line L in FIG. 6. A preset value of a load at the sensed rotational speed is calculated from the map. If the sensed rotational speed is $N_{REAL}$, then the preset value of the load would be $L_{SET}$ in FIG. 6.

At a point 104, it is determined whether or not the sensed value of the load $L_{REAL}$ is larger than the preset calculated value of the load $L_{SET}$. A "no" result means that the sensed load is in a range below the line L. In this partial load condition, the volumetric efficiency cannot be improved by changing the position of the control valve 34. Therefore, it is not important whether the control valve 34 is opened or closed. In this embodiment, the control valve 34 is closed at the partial load condition.

The "no" answer at the point 104 causes the program to proceed to a point 105 where the output port 442 issues a reset signal into the flip-flop unit 55 so that a low level signal is issued to the power amplifier 57. Therefore, the power amplifier 57 is not operated, so that the three-way switching valve 38 reches the position where the first port 381 is connected to the third port 383. As a result of this, the diaphragm 361 is opened to atmospheric pressure, so that the spring 362 causes the valve member of the control valve 34 to be seated on the valve seat 39.

A "yes" answer at the point 104 means that the sensed load of the engine is larger than the preset value $L_{SET}$ at the sensed rotational speed, i.e., the engine is under full load. In this case, the program proceeds to a point 108. At the point 108, it is determined whether or not the characteristic curve (a) produces a larger volumetric efficiency than curve (b) at the sensed rotational speed. When the rotational speed is in a range between $N_x$ and $N_y$, the answer is "yes." In this case, the program proceeds to the point 105 so that, as mentioned before, the three-way switching valve 38 is deenergized. Therefore, the control valve 34 is positioned to close the valve seat 39. As a result of this, the effective intake pipe length is enlarged so as to attained the curve (b). Thus, enhanced volumetric efficiency is obtained at the sensed rotational speed.

A "no" answer at the point 108 means that the sensed rotational speed is in a range lower than $N_x$ or higher than $N_y$. In this case, the program proceeds to a point 110, where the microprocessing unit 443 issues a signal to set the flip-flop unit 55 so tht it provides a high level signal to energize the power amplifier 57. Thus, the three-way switching valve 38 is energized and positioned so that the first port 381 is connected with the second port 382, causing the diaphragm 361 of the actuator 36 to be opened to the vacuum port 40 in the intake manifold 12 via the vacuum accumulation chamber 43 and the check valve 41. Under the effect of the vacuum, therefore, the diaphragm 361 is moved downward against the force of the spring 362 so as to open the valve seat 39. In this case, the effective intake pipe length is shortened, as described with reference to FIG. 4. Thus, the curve (a) is attained, so as to enhance the volumetric efficiency at the sensed rotational speed.

Figure 8:
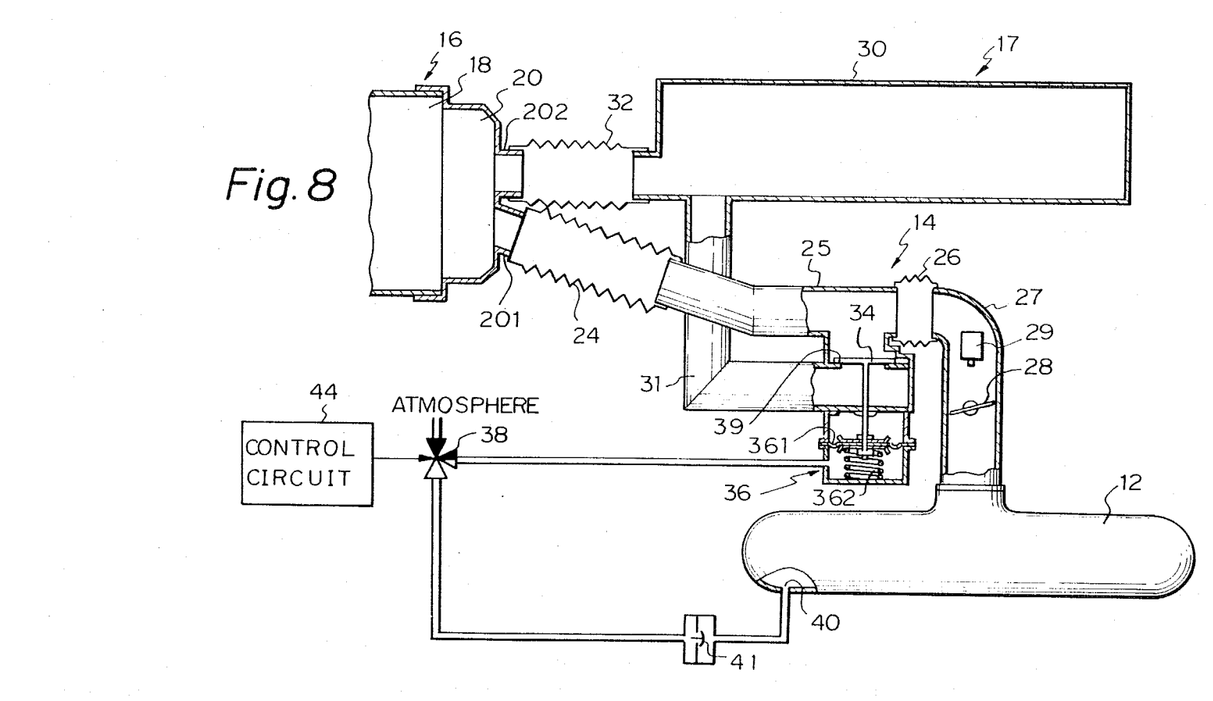
FIG. 8 is a diagram of a second embodiment of the present invention.

FIG. 8 shows a second embodiment which differs from the first embodiment in FIG. 2 in that the control valve 34 is of a normally open type. The control valve 34 has a spring 362 which urges the valve member so that it is detached from the valve seat 39 to open the first connecting pipe 31 to the pipe 25 of the main intake line 14. When the diaphragm 361 is opened to the vacuum, the control valve 34 is seated on the valve seat 39 to disconnect the first connecting pipe 31 from the pipe 25. The three-way switching valve 38, when not energized, is positioned so that the vacuum port 40 is connected to the diaphragm 361 in order to close the control valve 34. When the three-way switching valve 38 is energized, the diaphragm 361 is opened to the atmosphere so as to open the control valve 34. In this embodiment, as described with reference to FIG. 7, the valve is mainly positioned so that the diaphragm 361 is opened to the vacuum port 40. Thus, the vacuum level in the vacuum chamber is easy to maintain. Therefore, the vacuum accumulation chamber 43 as required in the first embodiment may be eliminated.

Figure 9:
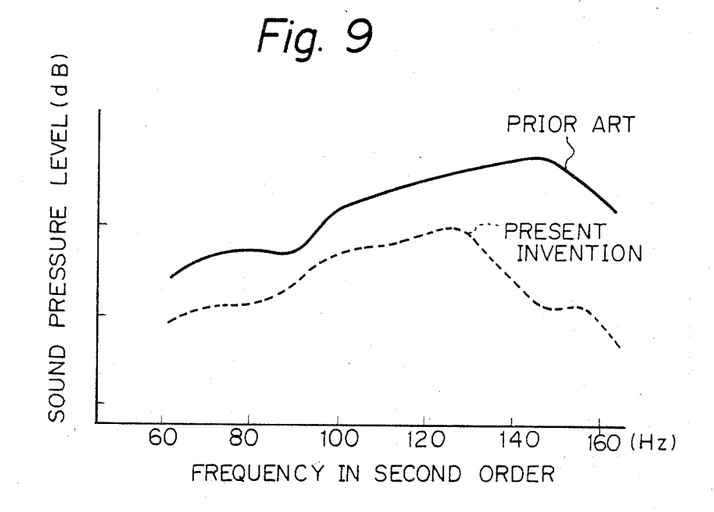
FIGS. 9 and 10 are graphs of the noise reduction effect of the present invention.
Figure 10:
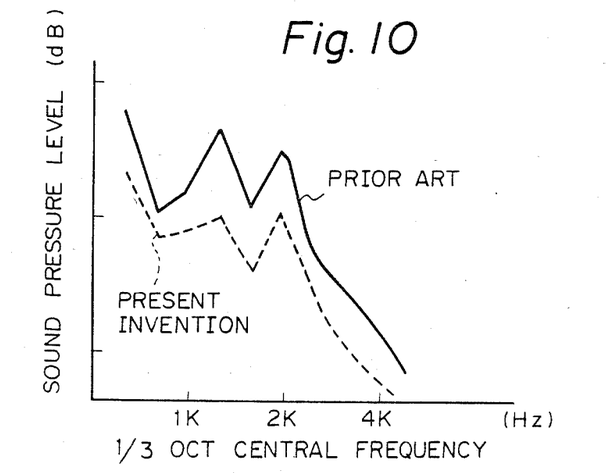

In the above-mentioned construction of the present invention, the tank 30 is always connected to the space 20 of the air cleaner 16 via the connecting pipe 32. This results in a substantial increase in the volume of the air cleaner 16. Since the noise level is reduced with an increase in the volume of the air cleaner 16, the noise level is decreased further. Therefore, effective noise reduction is attained. FIG. 9 shows the relationship between engine rotational speed in terms of frequency and the intake noise, wherein the solid line designates the prior art while the dotted line designates the present invention. FIG. 10 shows the relationship between the rotational speed in terms of frequency and engine operational noise, wherein the solid line designates the prior art while the dotted line designates the present invention.

I claim:

1. An intake system, for an internal combustion engine, comprising:
   an air cleaner having a housing, an inlet at one side of the housing, first and second outlets at an opposite side of the housing, and an enlarged chamber inside the housing in direct communication with said outlets;
   a main intake passageway connecting the first outlet of the air cleaner to the engine;
   a throttle valve arranged in the main intake passageway;
   a second intake passageway having a chamber of a predetermined volume, said second intake passageway having a first end connected to the second outlet of said air cleaner such that said second intake passageway is in fluidal communication with the enlarged chamber of said air cleaner, and having a second end spaced from said first end and connected to said main intake passageway at a position upstream of said throttle valve;

sensor means for detecting operating conditions of said engine; and control means, responsive to the sensed operating conditions of the engine, for opening and shutting fluidal communication between said second end of said second intake passageway and said main intake passageway, the predetermined volume of the second intake passageway chamber being such that the main intake passageway has a first resonance open end located at the first outlet of the air cleaner when communication is shut between the second end of the second intake passageway and the main intake passageway and a second resonance open end located at the connection between the second end of the second intake passageway and the main intake passageway when communication therebetween is open, whereby switching between two desired effective intake pipe lengths is attained according to varying operating conditions of the engine;

wherein said control means comprises:
  valve means located where said main intake passageway is connected to the second end of said second intake passageway;
  actuator means connected to said valve means for selectively operating said valve means; and
  circuit means responsive to signals from said sensor means for providing electrical signals to said actuator means; and wherein said circuit means comprises:
  means for storing, in accordance with a multiplicity of operating conditions, data indicating whether said valve means should be open or shut;
  means for calculating preset values of operating conditions at which the effective intake pipe length should be changed;
  means for deciding at each detected operating condition, by using the calculated value for said condition, whether or not the valve means should be open;
  means for operating said actuator means for causing said valve means to be opened when the decision is "yes"; and
  means for operating said actuator means for causing said valve means to be shut when the decision is "no".

2. An intake system according to claim 1, wherein:
said sensor means comprises a first detector for detecting the rotational speed of the engine and a second detector for detecting the load of the engine;
said storing means comprises a map of data of preset values of load for selected rotational speed values of said engine; and
said calculating means comprises means for calculating the preset load from the map at a combination of the sensed rotational speed and the sensed load.

3. An intake system for an internal combustion engine, comprising:
an air cleaner having a housing, an inlet at one side of the housing, first and second outlets at an opposite side of the housing, and an enlarged chamber inside the housing in direct communication with said outlets;
a main intake passageway connecting the first outlet of the air cleaner to the engine;
a throttle valve arranged to the main intake passageway;
a second intake passageway having a chamber of a predetermined volume, said second intake passageway having a first end connected to the second outlet of said air cleaner such that said second intake passageway is in fluidal communication with the enlarged chamber of said air cleaner, and having a second end spaced from said first end and connected to said main intake passageway at a position upstream of said throttle valve;
sensor means for detecting operating conditions of said engine; and
control means, responsive to the sensed operating conditions of the engine, for opening and shutting fluidal communication between said second end of said second intake passageway and said main intake passageway, the predetermined volume of the second intake passageway chamber being such that the main intake passageway has a first effective open end located at the first outlet of the air cleaner when communication is shut between the second end of the second intake passageway and the main intake passageway and a second effective open end located at the connection between the second end of the second intake passageway and the main intake passageway when communication therebetween is open, whereby switching between two desired effective intake pipe lengths is attained according to varying operating conditions of the engine.

4. An intake system according to claim 3, wherein said control means comprises:
valve means located where said main intake passageway is connected to the second end of said second intake passageway;
actuator means connected to said valve means for selectively operating said valve means; and
circuit means responsive to signals from said sensor means for providing electrical signals to said actuator means.

5. An intake system according to claim 4, wherein said actuator means comprises:
pressure-operated diaphragm means responsive to pressure therein for operating said valve means;
a fluid pressure signal source;
a pressure line connecting said diaphragm means with said fluid pressure signal source; and
switching valve means located in said pressure line and responsive to electric signals from said circuit means so that a pressure level in said diaphragm means is controlled in accordance with the operating conditions of the engine.

6. An intake system according to claim 5, wherein said fluid signal source comprises:
a vacuum port in the engine and
a check valve arranged in the pressure line so that transmission of vacuum signals is allowed only in a direction from the vacuum port to the diaphragm means.

7. An intake system according to claim 5, wherein said switching valve means comprises a three-way switching valve switchable between a first position, where said diaphragm means is connected to a vacuum port in the engine, and a second position, where said diaphragm means is connected to the atmosphere.

8. An intake system for an internal combustion engine, comprising:
- an air cleaner having a housing, an inlet at one side of the housing, first and second outlets at an opposite side of the housing, and an enlarged chamber inside the housing in direct communication with said outlets;
- a main intake passageway connecting the first outlet of the air cleaner to the engine;
- a throttle valve arranged in the main intake passageway;
- a second intake passageway having a chamber of a predetermined volume, said second intake passageway having a first end connected to the second outlet of said air cleaner such that said second intake passageway is in fluidal communication with the enlarged chamber of said air cleaner, and having a second end spaced from said first end and connected to said main intake passageway at a position upstream of said throttle valve;
- sensor means for detecting operating conditions of said engine; and
- control means, responsive to the sensed operating conditions of the engine, for opening and shutting fluidal communication between said second end of said second intake passageway and said main intake passageway, the predetermined volume of the second intake passageway chamber being such that the main inlet passageway has a first resonance open end located at the first outlet of the air cleaner when communication is shut between the second end of the second intake passageway and the main intake passageway and a second resonance open end located at the connection between the second end of the second intake passageway and the main intake passageway when communication therebetween is open, whereby switching between two desired effective intake pipe lengths is attained according to varying operating conditions of the engine;
- wherein said control means comprises:
- valve means located where said main intake passageway is connected to the second end of said second intake passageway;
- actuator means connected to said valve means for selectively operating said valve means; and
- circuit means responsive to signals from said sensor means for providing electrical signals to said actuator means;
- wherein said actuator means comprises:
- pressure-operated diaphragm means responsive to pressure therein for operating said valve means;
- a fluid pressure signal source;
- a pressure line connecting said diaphragm means with said fluid pressure signal source; and
- switching valve means located in said pressure line and responsive to electric signals from said circuit means so that a pressure level in said diaphragm means is controlled in accordance with the operating conditions of the engine; and
- wherein said valve means comprises:
- a valve seat located at the connection of said second intake passageway to said main intake passageway;
- a valve member located adjacent to said valve seat;
- connecting means for connecting said valve member with said diaphragm means; and
- means for urging said diaphragm means to move against the direction which said diaphragm means moves upon application of vacuum.

9. An intake system according to claim 8, wherein said valve member is located in the second end of said second intake passageway.

10. An intake system according to claim 8, wherein said urging means urges said diaphragm means to seat said valve member on said valve seat.

11. An intake system according to claim 8, wherein said urging means urges said diaphragm means to move said valve member away from said valve seat.

12. An intake system according to claim 10, further comprising a vacuum accumulator tank connected to the pressure line between said control valve means and said check valve.

* * * * *

UNITED STATES PATENT AND TRADEMARK OFFICE
CERTIFICATE OF CORRECTION

PATENT NO. : 4,565,166

DATED : January 21, 1986

INVENTOR(S) : Keiso Takeda

It is certified that error appears in the above-identified patent and that said Letters Patent is hereby corrected as shown below:

Column 1, line 46, change "(nV)" to --( V)--.

Column 2, line 61, change "pipe 28" to --pipe 28'--.

Column 2, line 65, omit the comma after "cleaner 16".

Column 3, line 47, change "resonance with" to --resonance when--.

Column 3, line 25, change "sub intake" to --subintake--.

Column 5, line 4, change "constituted" to --constituent--.

Column 5, line 42, change "reches" to --reaches--.

Column 5, line 61, change "as to attained" to --as to attain--.

UNITED STATES PATENT AND TRADEMARK OFFICE
CERTIFICATE OF CORRECTION

PATENT NO. : 4,565,166          Page 2 of 2

DATED : January 21, 1986

INVENTOR(S) : Keiso Takeda

It is certified that error appears in the above-identified patent and that said Letters Patent is hereby corrected as shown below:

Column 5, line 68, change "so tht" to --so that--.

Column 8, line 3, change "arranged to the" to --arranged in the--.

Column 9, line 30, change "main inlet passageway" to --main intake passageway--.

Signed and Sealed this

Twenty-ninth Day of April 1986

[SEAL]

Attest:

DONALD J. QUIGG

Attesting Officer      Commissioner of Patents and Trademarks